Feb. 13, 1934.  R. H. HAMME  1,946,741
COTTON HARVESTER
Filed Jan. 23, 1929  7 Sheets-Sheet 6
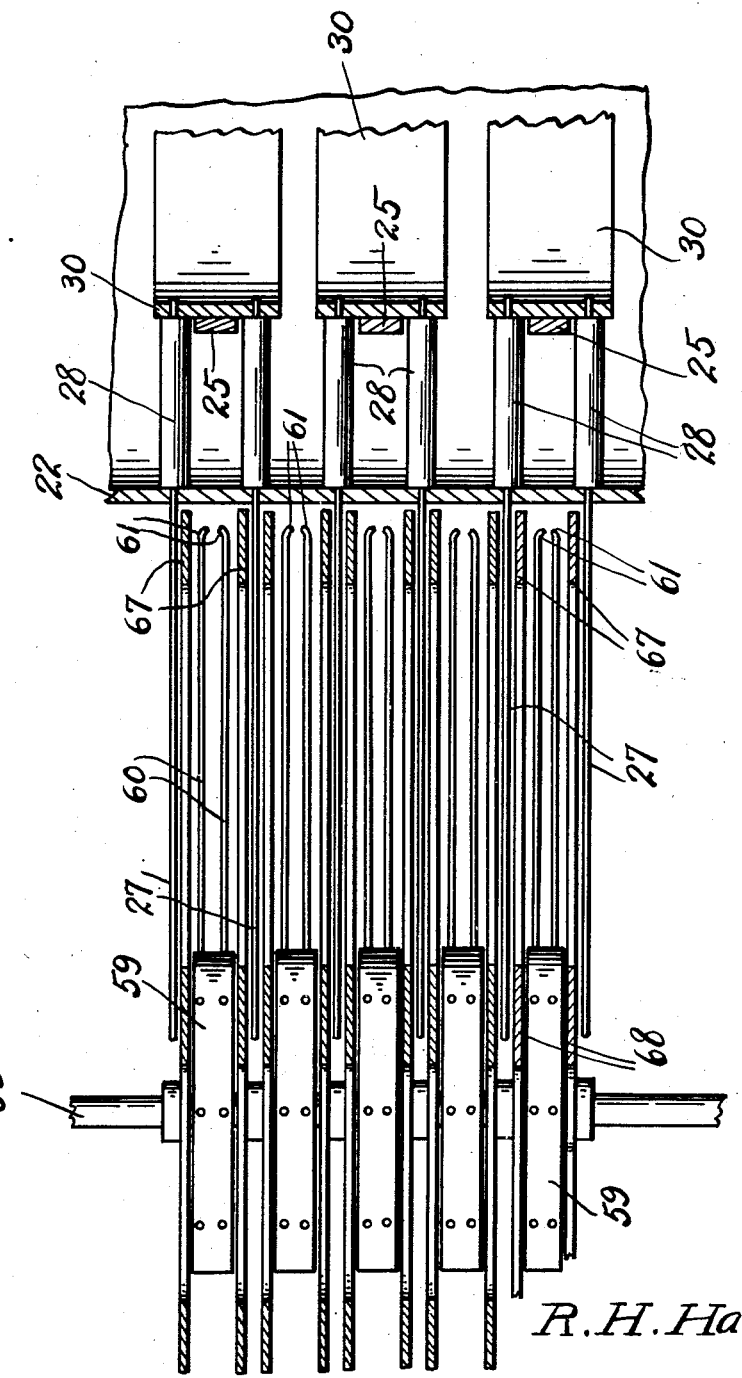
Inventor
R. H. Hamme
By Clarence A. O'Brien
Attorney Feb. 13, 1934.  R. H. HAMME  1,946,741
COTTON HARVESTER
Filed Jan. 23, 1929  7 Sheets-Sheet 7
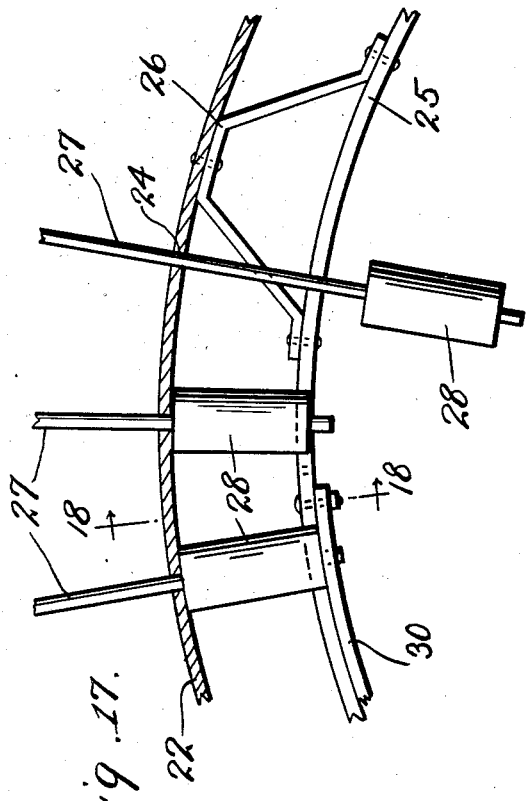
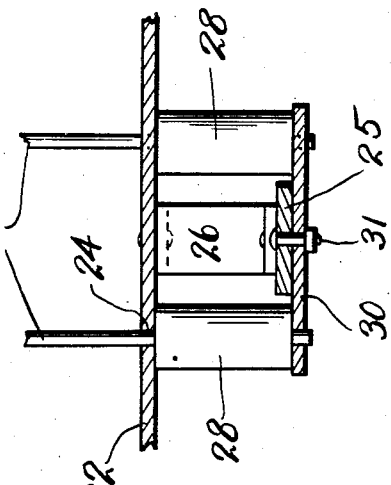
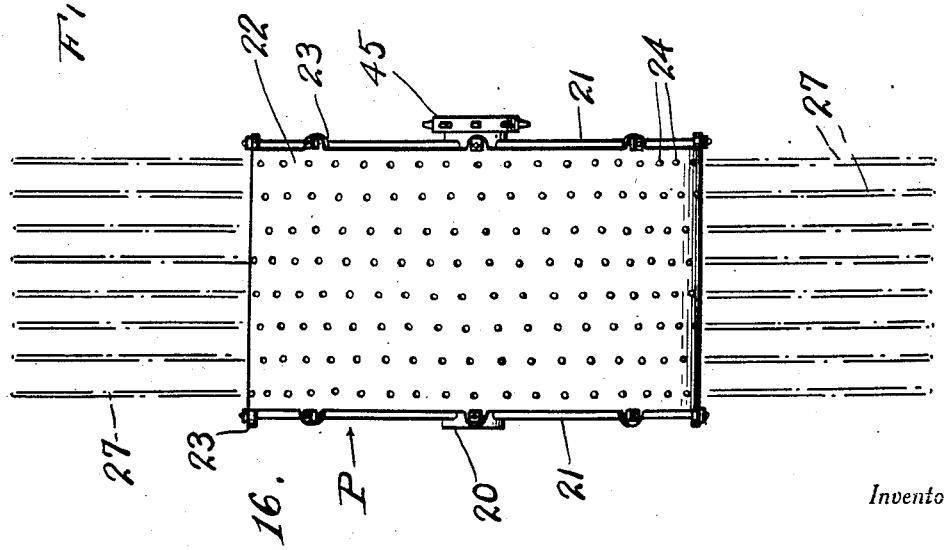
Inventor
R. H. Hamme
By Clarence A. O'Brien
Attorney Patented Feb. 13, 1934

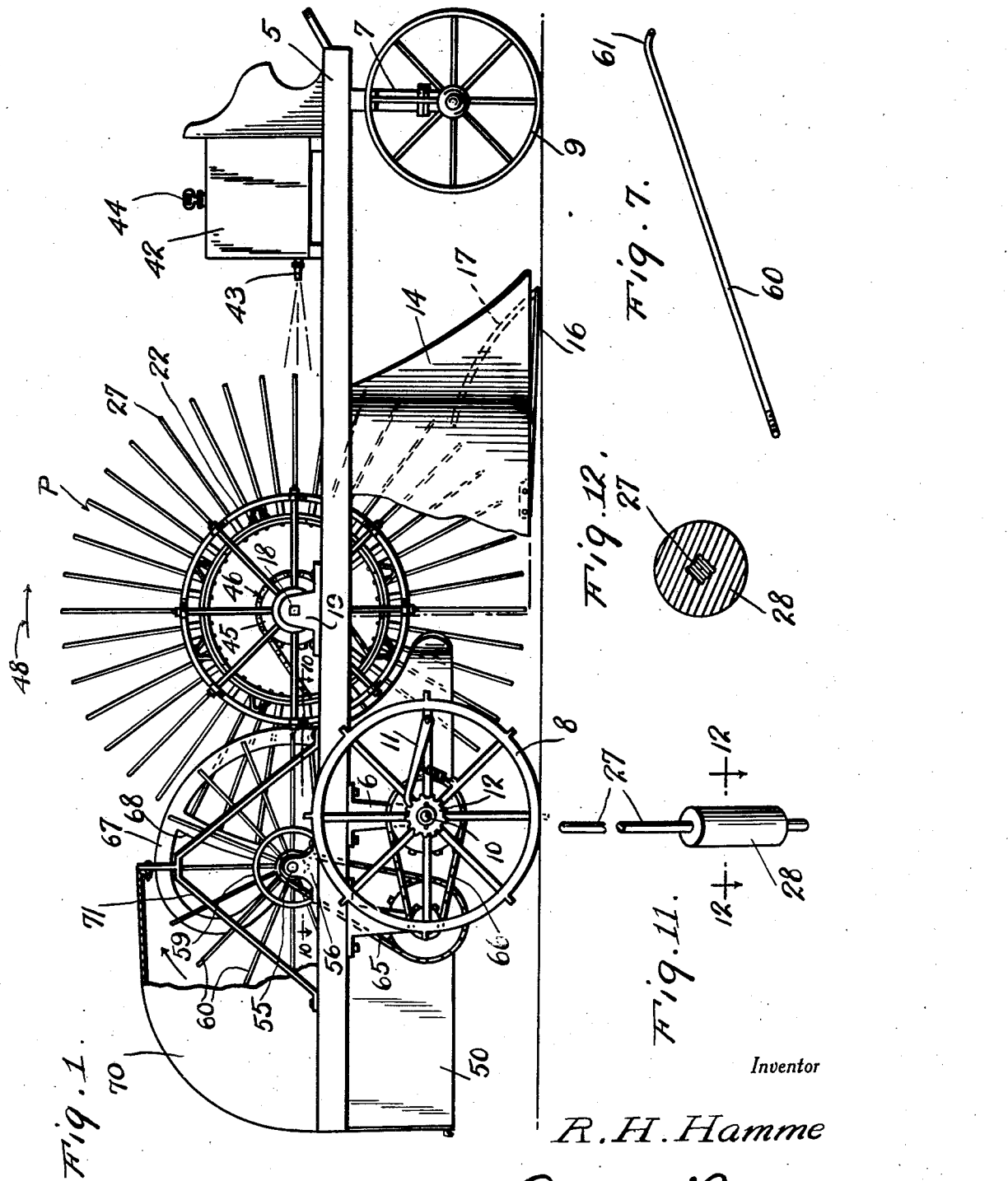

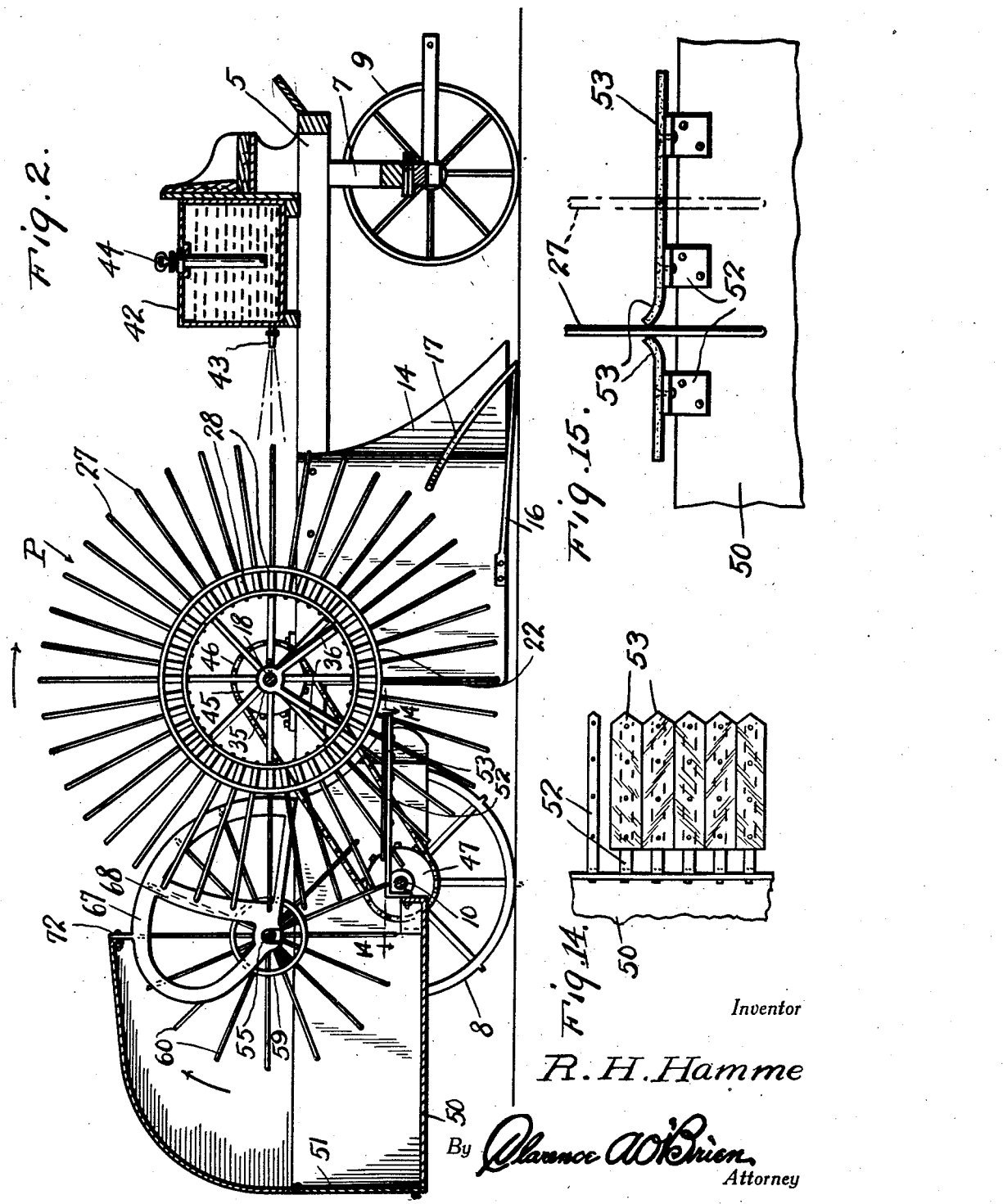

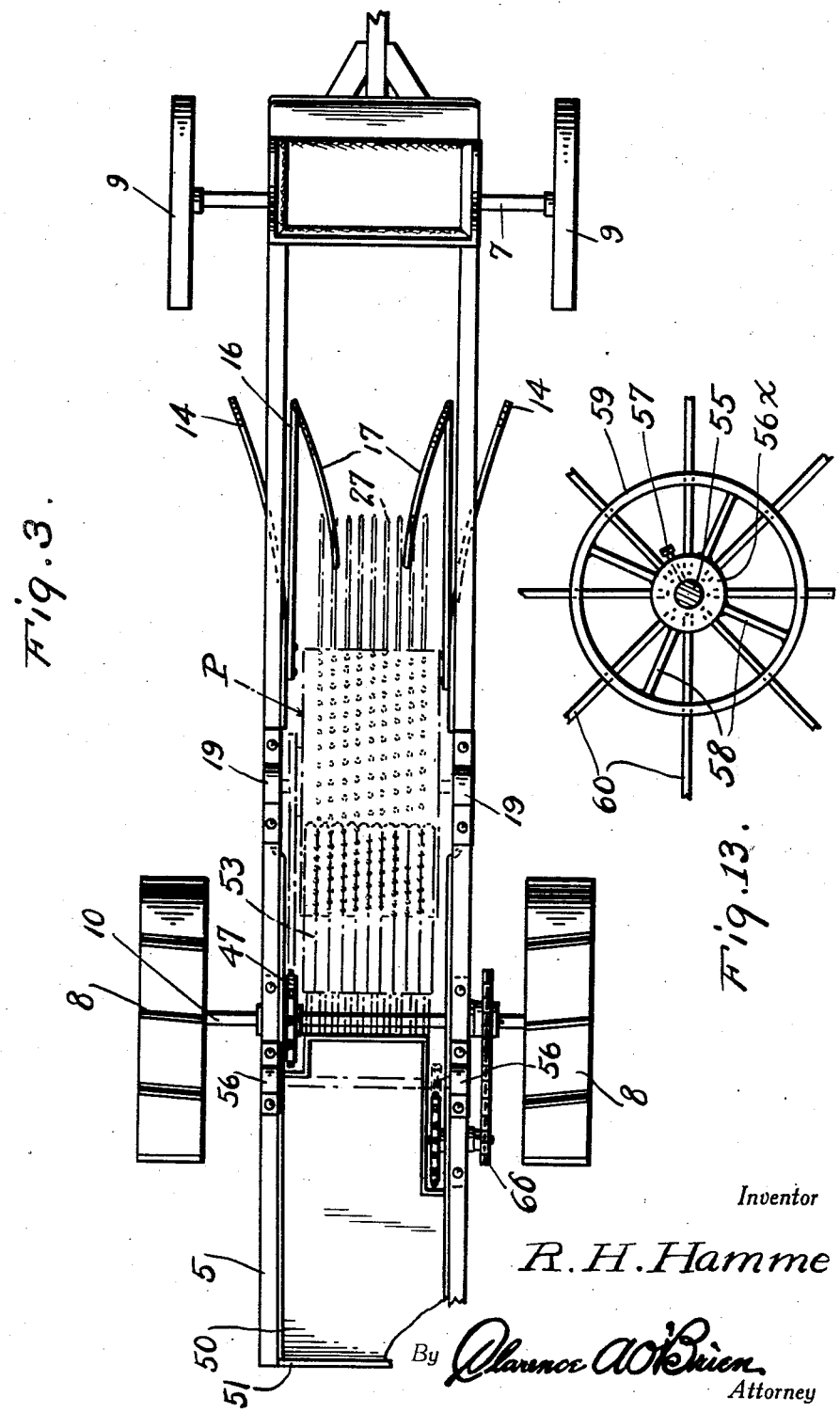

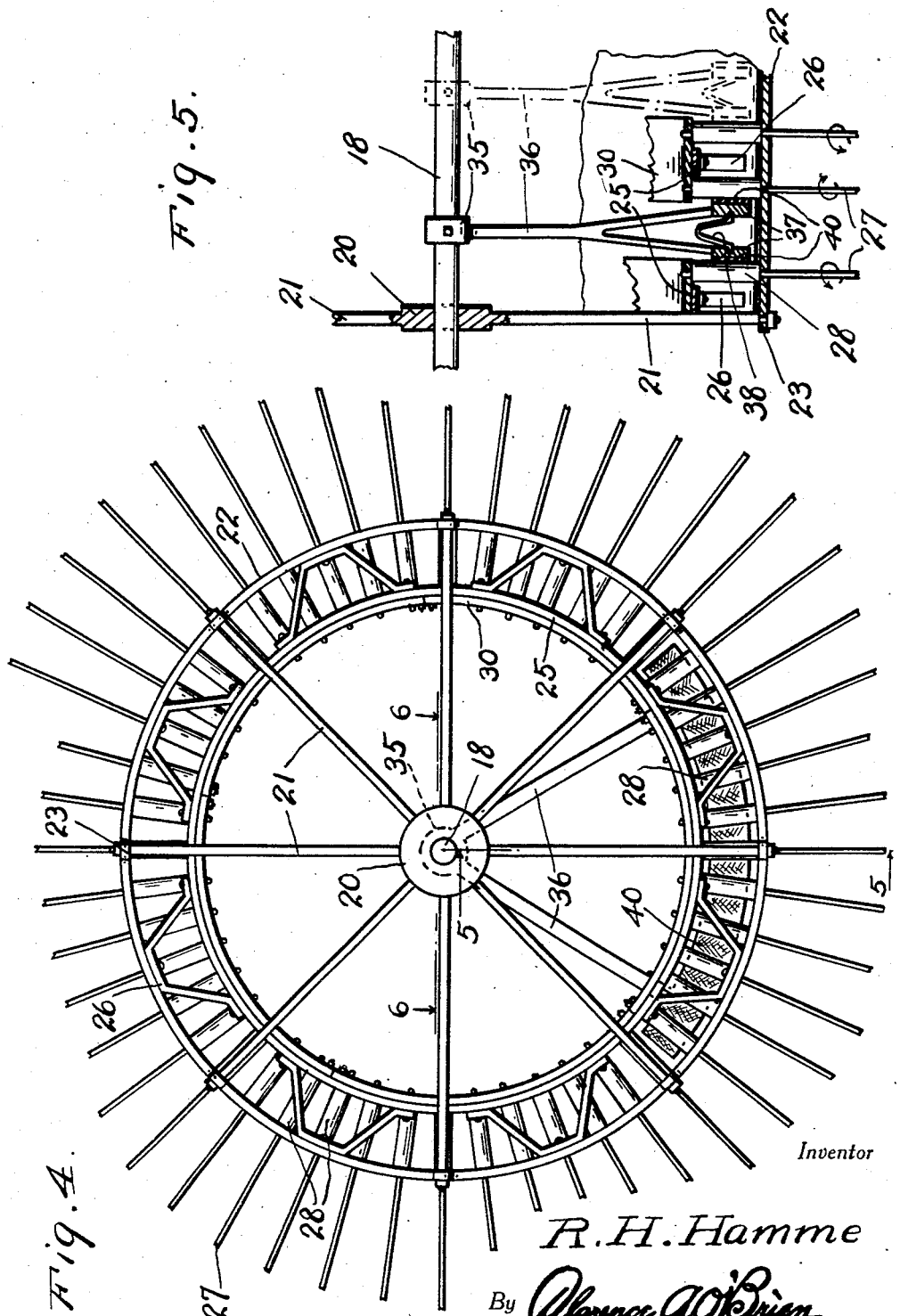

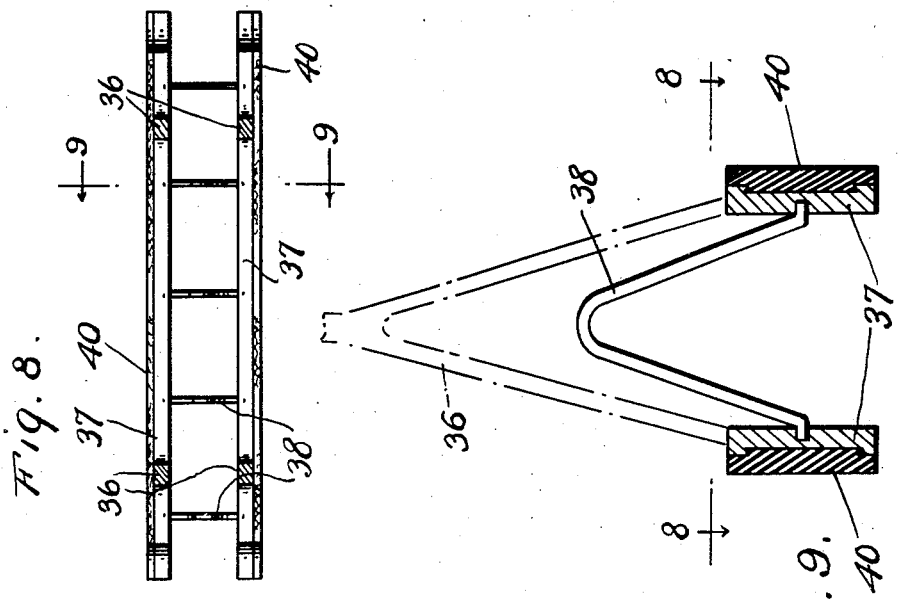
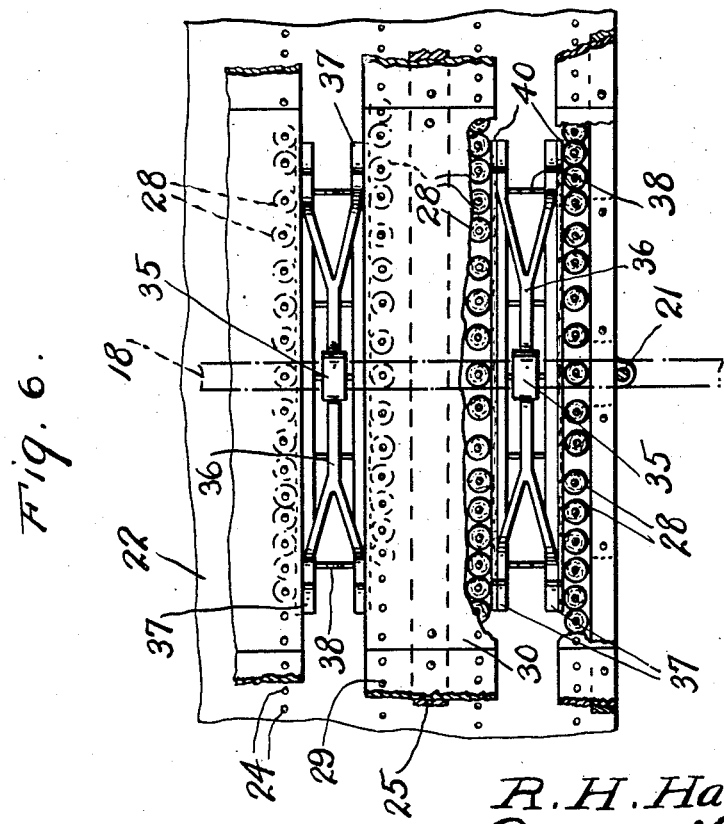

1,946,741

UNITED STATES PATENT OFFICE 1,946,741

COTTON HARVESTER

Richard Henry Hamme, Oxford, N. C., assignor to Deere & Company, Moline Ill., a corporation of Illinois Application January 23, 1929. Serial No. 334,430

35 Claims. (Cl. 56—41)

The present invention relates to a cotton harvester and has for its general object to provide a machine which will bunch a predetermined number of rows of cotton, straighten up the plants, pick the cotton from the plant, strip the cotton from the picker mechanism and deposit the cotton in a collecting box.

Another very important object of the invention resides in the provision of a rotary picker structure including a plurality of radially disposed needles which revolve about their own axes while in the act of picking cotton from the plants.

Another very important object of the invention resides in the provision of a mechanism of this nature whereby the picker needles are moistened just before engaging the plant.

A further important object of the invention resides in the provision of a picker structure of this nature in combination with a doffer consisting of needles to rake the cotton from the picker needles.

A still further very important object of the invention resides in the provision of a machine of this nature which is comparatively simple in its structure, inexpensive to manufacture, strong and durable, compact and convenient in its arrangement of parts, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the machine embodying the features of my invention, Figure 2 is a vertical longitudinal section therethrough, Figure 3 is a top plan view thereof, Figure 4 is a side elevation of the picker mechanism, Figure 5 is a sectional view taken substantially on the line 5—5 of Figure 4, Figure 6 is a sectional view taken substantially on the line 6—6 of Figure 4, Figure 7 is a perspective view of one of the doffer needles, Figure 8 is a detail view of one pair of the shoes to cause rotation of the picker needles taken substantially on the line 8—8 of Figure 9.

Figure 9 is an enlarged transverse section taken substantially on the line 9—9 of Figure 8, Figure 10 is an enlarged detail horizontal section taken substantially on the line 10—10 of Figure 1, Figure 11 is a perspective view of one of the picker needles, Figure 12 is a sectional view therethrough taken substantially on the line 12—12 of Figure 11, Figure 13 is a detail sectional view showing particularly one of the hubs of the doffer structure, Figure 14 is an enlarged detail view taken substantially on the line 14—14 of Figure 2, Figure 15 is a fragmentary end view of the structure shown in Figure 14, Figure 16 is a plan view of the picker mechanism with the needles removed, Figure 17 is an enlarged detail section therethrough, and Figure 18 is an enlarged detail section taken substantially on the line 18—18 of Figure 17.

Referring to the drawings in detail it will be seen that the numeral 5 denotes a frame of substantial rectangular formation and supported through suitable means 6 and 7 on rear and front wheels 8 and 9 respectively.

Axle 10 of rear wheels 8 is rotatably mounted in the means 6 and the wheels are rotatably mounted thereon. These rear wheels have a spring pressed pawl 11 engaging ratchet wheels 12 on the shaft 10 so that the faster rear wheel will drive the shaft 10.

This wheeled frame may be pulled along by any suitable draft means. A pair of fenders 14 are mounted on the intermediate portion of the frame 5 to the rear of front wheels 6. These fenders 14 depend from the frame and diverge outwardly and forwardly from each other for the purpose of bunching the cotton plants, and tines 16 are fixed to the fenders and have at their front ends upwardly, inwardly and rearwardly inclined curved extensions 17 forming lifters for any leaning or fallen cotton plants.

The picker mechanism is denoted generally by the letter P and is located rearwardly of the lifter extensions 17. This picker mechanism includes a stationary shaft 18 mounted in brackets 19 rising from the sides of the frame 5.

Hubs 20 are rotatable on the axle 18 and have spokes 21 radiating outwardly therefrom. An annular rim 22 is provided at its side edges with apertured ears 23 to receive the outer ends of the spokes 21. This rim 22 is provided with a plurality of annular series of apertures 24. Annular bands 25 are disposed within the rim 22 and spaced therefrom by means of brackets 26 interposed between and connected to the rims and bands.

Elongated straight picker needles 27 extend through apertures 24 and adjacent their inner ends are provided with rollers 28 fixed to rotate therewith as is indicated to advantage in Figure 12. The inner ends of these needles are journaled in apertures 29 of plate segments 30 detachably secured to the band 25 in any suitable manner as by bolts and nuts 31 indicated to advantage in Figures 17 and 18.

By referring to Figure 17 particularly it will be seen that by removing a plate segment 30 a plurality of the picker needles may be easily withdrawn inwardly from the assembly.

Between the bands 25 on the shaft 18 there is fixed hubs 35 from each of which depend and diverge downwardly from each other a pair of legs 36 which support arcuate shoes 37 urged away from each other by V-shaped springs 38, and on the outer surfaces of these shoes are rubber or friction strips 40 for engaging the rollers 28 to bring about the rotation of the picker needles through approximately the bottom quarter of their movement about the shaft 18. This means that the picker needles start rotating just before they engage the cotton on the plant and cease rotating when they are raked by the doffer mechanism as will be brought out more clearly later in the description.

A tank 42 is mounted on the front of the frame 5 and has rearwardly projecting nozzles 43 and is adapted to contain water and have a suitable pump 44 associated therewith so as to create a pressure in the tank and to spray the water rearwardly on the picker needles to moisten these picker needles just before they come into contact with the cotton plant.

This picker mechanism is rotated by means of a sprocket 45, chain 46 and sprocket 47 on axle 10 and therefore the picker mechanism P rotates in the direction of arrows 48 as shown in Figure 1, that is forwardly so that when the needles actually engage the cotton plant they are moving downwardly and rearwardly.

The rotary motion of these needles causes the cotton to be picked from the plant and wrapped about the needle, so as not to fall on the ground and to efficiently strip the cotton from the plant.

The numeral 50 denotes a box mounted to depend rearwardly from the rear end of the frame 5 and the front of the box is open. The rear of the box is closed by a suitable door 51. A plurality of spaced parallel coextensive bars 52 extend forwardly from the front of the box in a horizontal plane a little above the axle 10 and strips of flexible material such as rubber 53 are secured along the upper surfaces of these bars 51 so as to have their edges in abutting relation and the picker needles pass between these strips in an upwardly and rearwardly moving direction as is indicated to advantage in Figure 15.

The purpose of these strips is to prevent any cotton when raked off the picker needles from falling down on the ground. A shaft 55 is journaled in suitable boxings 56 on the rear portion of the frame forwardly of the box 50 and has fixed thereon a plurality of hubs 56x mounted by means of set screws 57.

Spokes 58 radiate from the hub and support a bracing ring 59. Doffer needles or members 60 are threadedly engaged in the hub 56 and pass through openings in the ring 59. These needles or members are arranged in pairs and have their outer ends bent toward each other as is indicated at 61.

The shaft 55 rotates in the same direction as the picker mechanism P through chain and sprocket mechanism 65 which is actuated from the axle 10 by chain and sprocket mechanism 66. These doffer needles rake the cotton from the picker needles and drop the same in the box 50.

Substantially arcuate guides 67 are mounted by a suitable spoke like means 68 on the shaft 55 and disposed between the hubs on the shaft and the different series of doffer needles so as to prevent the doffer needles from becoming entangled with the picker needles as will be appreciated by an inspection of Figure 10.

A suitable head 70 is mounted over the boxing having its front end bridged by a bracket structure 71 which also supports the guides 67 as is indicated to advantage at 72 in Figure 2.

The doffer revolves considerably faster than the needle mechanism, it being geared much higher as will be apparent, although driven from the same driving means. The picker needles with the cotton come very close to the doffer and the needles are placed so close together that the doffer needles scrape off the cotton from the picker needles.

The picker needles go between narrow bands or guides on the doffer. The bent ends of the doffer needles prevent them from hanging in the picker needles.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a machine of the class described, a rotary picker mechanism including a plurality of radiating needles, means for revolving the needles about their axes, doffing mechanism, and means through which said needles pass, for supporting cotton displaced from the needles.

2. In a machine of the class described, a rotary picker mechanism including a plurality of radiating needles, means for revolving the needles about their axes when in the act of picking cotton from plants, doffing mechanism, and means through which said needles pass, for supporting cotton displaced from the needles.

3. In a machine of the class described, a rotary picker mechanism including a plurality of radiating needles, means for revolving the needles about their axes when in the act of picking cotton from plants, means for raking the cotton from the picker needles, means for receiving the cotton so raked or doffed, and flexible means in front of said receiving means and through which the needles pass for supporting displaced cotton.

4. In a machine of the class described, a rotary picker mechanism including a plurality of radiating needles, and means for revolving the needles about their axes when in the act of picking cotton from plants including rollers on the needles and friction creating means for engaging the rollers during rotation of the picker mechanism, a revolving doffer mechanism including a plurality of needles to rake the cotton from the picker needles, and bars between the picker needles and doffer needles; the two kinds of needles being intermeshed and the bars being mounted in planes perpendicular to the axis of the doffer mechanism and between the two types of needles at their intermeshing portions.

5. In a machine of the class described, a rotary picker mechanism including a plurality of radiating needles, and means for revolving the needles about their axes when in the act of picking cotton from plants, a revolving doffer mechanism including a plurality of needles to rake the cotton from the picker needles, and bars between the picker needles and doffer needles; the two kinds of needles being interposed, and the bars being mounted in plane perpendicular to the axis of the doffer mechanism and between the two types of needles at their intermeshing portions.

6. In a machine of the class described, a rotary picker mechanism including a plurality of radiating needles, and means for revolving the needles about their axes when in the act of picking cotton from plants, a revolving doffer mechanism including a plurality of needles to rake the cotton from the picker needles, a box enclosing a portion of the doffing mechanism and arranged to receive cotton therefrom, a plurality of bars extending forwardly from the box in spaced parallelism to each other, and flexible strips on the bar, the edges of said strips meeting and the picker needles passing between the strips so as to prevent cotton raked by the doffer mechanism from the picker needles from falling on the ground.

7. A rotary picker mechanism including a stationary shaft, hubs rotatable about the stationary shaft, spokes radiating from the hubs, a rim supported by said spokes, a plurality of needles rotatable through openings in the rim, a plurality of bands, means for mounting the bands within the rim, plate segments mounted on the band, the inner ends of the needles being journaled in the plate segments, means detachably mounting the plate segments on the band, and means for causing the rotation of the needles about their axes.

8. A rotary picker mechanism including a stationary shaft, hubs rotatable about the stationary shaft, spokes radiating from the hubs, a rim supported by said spokes, a plurality of needles rotatable through openings in the rim, a plurality of bands, means for mounting the bands within the rim, plate segments mounted on the band, the inner ends of the needles being journaled in the plate segments, rollers on the needles between the plate segments and the rim, and means for engaging the rollers to cause rotation of the needles.

9. A rotary picker mechanism including a stationary shaft, hubs rotatable about the stationary shaft, spokes radiating from the hubs, a rim supported by said spokes, a plurality of needles rotatable through openings in the rim, a plurality of bands, means for mounting the bands within the rim, plate segments mounted on the band, the inner ends of the needles being journaled in the plate segments, means detachably mounting the plate segments on the band, rollers on the needles between the plate segments and the rim, arcuate shoes, means for supporting the shoes, means urging the shoes in engagement with the rollers to cause rotation of the needles about their axes.

10. A machine of the class described including a wheeled frame, fenders depending from the frame and diverging forwardly from each other to bunch cotton plants together, means for straightening up bent over and fallen plants, said means being located between the fenders, a rotatable picker mechanism mounted on the frame to rotate in a longitudinal vertical plane between the fenders to engage plants between the fenders, doffer mechanism on the rear of the frame mounted to rotate in a longitudinal vertical plane to rake the cotton from the picker mechanism, and a box to receive the cotton.

11. In a cotton harvester and in combination, a rotary picker mechanism including a plurality of radiating needles disposed in pairs of parallel rows perpendicular to the axis of the picker mechanism, means for turning the needles about their axes incident to rotation of the picker mechanism, said means including rollers on the needles, a pair of friction creating means for each pair of rows of picking needles engaging adjacent sides of the rollers thereof, and yielding means between the friction creating means of each pair to urge them apart and into contact with the rollers.

12. In a machine of the class described, a rotary picker mechanism comprising a drum upon which a plurality of radiating needles are mounted, means for revolving the drum about its axis, revolving doffer mechanism including a plurality of doffer members radiating from an axle positioned parallel to the axis of said drum, the doffer members intermeshing with the picking needles, and guides positioned between the doffer members and picking needles in a portion of the intermeshing area, one end of said guides being shaped to guide the doffer members into the space between the guides.

13. In a machine of the class described, a rotary picker mechanism comprising a drum upon which a plurality of radiating needles are mounted, means for revolving the drum about its axis, revolving doffer mechanism including a plurality of doffer members radiating from an axle positioned parallel to the axis of said drum, the doffer members intermeshing with the picking needles, and guides positioned between the doffer members and picking needles in a portion of the intermeshing area, one end of the guides being curved so that the doffer members will be guided between the guides by progressively contacting with the guides from their base portion to the outer end thereof.

14. In a machine of the class described, a rotary picker mechanism comprising a drum upon which a plurality of radiating needles are mounted, means for revolving the drum about its axis, revolving doffer mechanism including a plurality of doffer members radiating from an axle positioned parallel to the axis of said drum, the doffer members intermeshing with the picking needles, and guides positioned between the doffer members and picking needles in a portion of the intermeshing area, one end of the guides being shaped so that the point of intersection of the doffing members with the plane defined by said one end of the guides travel outwardly along the doffing members.

15. In a machine of the class described, a rotary picker mechanism comprising a drum upon which a plurality of radiating needles are mounted, means for revolving the needles about their axes and for revolving the drum about its axis, revolving doffer mechanism including a plurality of needles radiating from an axle positioned parallel to the axis of said drum, the doffer needles intermeshing with the picking needles, and guides positioned between the doffer needles and picking needles in a portion of the intermeshing area to keep the doffing needles from contacting the picking needles until the movement of said doffing needles with respect to said picking needles is outwardly of said picking needles.

16. In a machine of the class described, a rotary picker mechanism comprising a drum upon which a plurality of radiating needles are mounted, means for revolving the needles about their axes and for revolving the drum about its axis, revolving doffer mechanism including a plurality of needles radiating from an axle positioned parallel to the axis of said drum, the doffer needles intermeshing with the picking needles, and guides positioned between the doffer needles and picking needles in a portion of the intermeshing area from the point at which the doffing needles enter said area to a point beyond the plane drawn through the axis of said drum and the axis of said doffing mechanism.

17. In a machine of the class described, a rotary picker mechanism comprising a drum upon which a plurality of radiating needles are mounted in axially spaced circumferential rows, means for revolving the drum about its axis, revolving doffer mechanism including a plurality of doffer members radiating from an axle positioned parallel to the axis of said drum, the doffer members intermeshing with the picking needles and arranged in pairs of rows, one pair for each set of picking needles, the two rows of each pair operating on opposite sides of a row of picking needles.

18. In a machine of the class described, a rotary picker mechanism comprising a drum upon which a plurality of radiating needles are mounted in axially spaced circumferential rows, means for revolving the drum about its axis, revolving doffer mechanism including a plurality of doffer members radiating from an axle positioned parallel to the axis of said drum, the doffer members intermeshing with the picking needles and arranged in pairs of rows, one pair for each set of picking needles, the two rows of each pair operating on opposite sides of a row of picking needles, and axially spaced rims for supporting the doffer members, each rim supporting one row of one pair and the adjacent row of the adjacent pair.

19. In a machine of the class described, a rotary picker mechanism comprising a drum upon which a plurality of radiating needles are mounted in spaced rows, means for revolving the drum about its axis, revolving doffer mechanism including a plurality of needles radiating from an axle positioned parallel to the axis of said drum, the doffer needles intermeshing with the picking needles and arranged in pairs of rows, one pair for each set of picking needles, the two rows of each pair operating on opposite sides of a row of picking needles, and guides in a portion of the intermeshing area positioned between each doffing needle and the picking needle with which it is associated.

20. In a machine of the class described, a picker mechanism including a plurality of needles, means for inserting and withdrawing said needles from cotton plants, means for revolving the needles about their axes, doffing mechanism, and means through which said needles pass, for supporting cotton displaced from the needles.

21. In a cotton picker, revolving picking means comprising a plurality of radiating picking needles arranged in parallel planes perpendicular to the axis of said picking means, a revolving doffer comprising radiating doffer members arranged in parallel planes perpendicular to the axis of the doffer, and positioned to bring said doffing members into intermeshing relationship with the needles of said picking means whereby the doffer members may contact with said needles to strip picked cotton from said needles, and means for preventing said doffing members from contacting with said picking needles over a portion of the intermeshing area.

22. In a cotton picker, rotary picker mechanism including a plurality of radiating needles, means for revolving the needles about their axes when in the act of picking cotton from plants, a revolving doffer mechanism including a plurality of doffing members to brush the cotton from the picker needles, and separators between the picker needles and doffing members, the picker needles and doffing members being interposed, and the separators being mounted in a plane perpendicular to the axis of the doffer mechanism and between the picker needles and the doffing members at their intermeshing portions.

23. In a cotton picker, a plurality of picking needles arranged in parallel planes, means for successively inserting said needles into and withdrawing them from cotton plants, doffing mechanism comprising a plurality of doffing members arranged in parallel planes intermeshing with the planes of said picking needles, means for successively bringing said doffing members into and withdrawing them out of the intermeshing area to bring them into doffing relationship with the needles, and means for keeping said doffing members out of doffing relationship with the needles in a certain portion of the intermeshing area.

24. In a cotton picker, a plurality of picking needles arranged in parallel planes, means for successively inserting said needles into and withdrawing them from cotton plants by movement thereof in closed paths, doffing mechanism comprising a plurality of doffing members arranged in parallel planes, means for moving said doffing members in closed paths intermeshing with the paths of said needles to successively bring said doffing members into doffing relationship with said needles, and means for keeping said doffing members out of doffing relationship with said needles in a certain portion of the intermeshing area.

25. In a cotton picker, a rotatable drum including means forming a rim, a plurality of plate segments, means extending inwardly from said rim forming means for supporting said segments spaced radially from the rim forming means and from each other axially of the drum, said segment supporting means having connection with said segments along the longitudinal center line thereof, a plurality of rotatable needles extending through openings in said rim forming means, the inner ends of the needles being journaled in the plate segments at each side of said segment supporting means, means for rotating said drum to successively insert said needles into cotton plants, and means projecting from within said drum between adjacent plate segments and having driving engagement with that portion of the needles disposed between the rim of the drum and the plate segments for rotating the needles.

26. In a cotton picker, a rotatable drum including means forming a rim, a plurality of plate segments, means extending inwardly from said rim forming means for supporting said segments spaced radially from the rim forming means and from each other axially of the drum, a plurality of rotatable needles extending through openings in said rim forming means, the inner ends of the needles being journaled in the plate segments, means for rotating said drum to successively insert said needles into cotton plants, and means disposed in the space between adjacent plate segments and having driving engagement with that portion of the needles disposed between the rim of the drum and the plate segments for rotating the needles.

27. In a cotton picker, a rotatable drum including means forming a rim, a plurality of plate segments, means extending inwardly from said rim forming means for supporting said segments spaced radially from the rim forming means and from each other axially of the drum, a plurality of rotatable needles extending through openings in said rim forming means, the inner ends of the needles being journaled in the plate segments, means for rotating said drum to successively insert said needles into cotton plants, and means disposed between adjacent plate segments for rotating said needles while they are in cotton plants.

28. In a cotton picker, a rotatable drum including means forming a rim, a plurality of plate segments, means extending inwardly from said rim forming means for supporting said segments spaced radially from the rim forming means and from each other axially of the drum, a plurality of rotatable needles extending through openings in said rim forming means, the inner ends of the needles being journaled in the plate segments, means for rotating said drum to successively insert said needles into cotton plants, rollers on said needles between the plate segments and the rim forming means, and stationary means disposed between adjacent plate segments and engaging the rollers to cause rotation of the needles.

29. In a cotton picker, a rotatable drum including means forming a rim, a plurality of plate segments, means extending inwardly from said rim forming means for supporting said segments in spaced relation to the rim forming means, a plurality of needles rotatable through openings in said rim forming means, the inner ends of the needles being journaled in the plate segments, means for rotating said drum to successively insert said needles into cotton plants, rollers on the needles between the plate segments and the rim forming means adjacent said rollers, arcuate shoes, stationary means extending between said plate segments for supporting said shoes, and means for urging said shoes in engagement with said rollers to cause rotation of the needles about their axes.

30. In a cotton picker, a stationary axle, a drum rotatably mounted on said axle, said drum including rim forming means and means forming a series of spaced rings supported within said rim forming means and in spaced relation thereto, a plurality of needles journaled in aligned holes in said rim forming means and said rings, supporting means fixed to said axle and extending between said rings, and a pair of arcuate shoes contacting said needles between said rim forming means and said rings and supported by said supporting means.

31. In a cotton picker, a rotatable drum including means forming a rim, means forming a series of spaced rings supported in spaced relation to said rim forming means, a plurality of needles journaled in aligned holes in said rim forming means and said rings, and stationary means extending between said rings and contacting with said needles to cause rotation of the needles responsive to rotation of the drum, said means including a pair of shoes on said stationary means, and spring means between the shoes of each pair to urge them into frictional driving contact with the needles journaled in adjacent rings.

32. In a cotton picker, a plurality of picking needles arranged in parallel planes, means for successively inserting said needles into and withdrawing them from cotton plants, doffing mechanism comprising a plurality of doffing members arranged in parallel planes intermeshing with the planes of said picking needles, means for successively bringing said doffing members into and withdrawing them out of the intermeshing area to bring them into doffing relationship with the needles, and guides positioned between the planes of the needles and the planes of the doffing members in a certain portion of the intermeshing area, one end of said guides being shaped to guide the doffing members into the intermeshing area.

33. In a cotton picker, a plurality of picking needles arranged in parallel planes, means for successively inserting said needles into and withdrawing them from cotton plants, doffing mechanism comprising a plurality of doffing members arranged in parallel planes intermeshing with the planes of said picking needles, means for successively bringing said doffing members into and withdrawing them out of the intermeshing area to bring them into doffing relationship with the needles, and guides positioned on opposite sides of the picking needles to prevent the doffing members from having doffing relationship with said needles in a certain portion of the intermeshing area, one end of said guides being shaped to guide the doffing members into the intermeshing area.

34. In a cotton picker, a plurality of picking needles arranged in parallel planes, means for successively inserting said needles into and withdrawing them from cotton plants, doffing mechanism comprising a plurality of doffing members arranged in parallel planes intermeshing with the planes of said picking needles, means for successively bringing said doffing members into and withdrawing them out of the intermeshing area to bring them into doffing relationship with the needles, and guides positioned on opposite sides of the needles between the needles and the adjacent doffing members in a certain portion of the intermeshing area, one end of said guides being shaped to lead the needles between the guides by contacting therewith initially with the base portion thereof and then progressively outwardly towards the tip of the needles.

35. In a cotton picker, a plurality of picking needles arranged in parallel planes, means for successively inserting said needles into and withdrawing them from cotton plants, doffing mechanism comprising a plurality of doffing members arranged in parallel planes intermeshing with the planes of said picking needles, means for successively bringing said doffing members into and withdrawing them out of the intermeshing area to bring them into doffing relationship with the needles, and guides positioned between the planes of the needles and the planes of the doffing members in the intermeshing area, one end of said guides being shaped to guide the doffing members into the intermeshing area, and the other end of said guides being shaped to guide the picking needles by contacting therewith initially with the base portion thereof and then progressively outwardly towards the tip of the needles.

RICHARD HENRY HAMME.